United States Patent [19]

Edwards

[11] 3,835,812

[45] Sept. 17, 1974

[54] ANIMAL TOILET

[76] Inventor: Cyril H. Edwards, 25336 Coulston St., Loma Linda, Calif. 92354

[22] Filed: Jan. 16, 1973

[21] Appl. No.: 324,226

[52] U.S. Cl. ................................................ 119/1
[51] Int. Cl. ........................................... A01k 29/00
[58] Field of Search .................................. 119/1, 15

[56] References Cited
UNITED STATES PATENTS

| | | | |
|---|---|---|---|
| 3,119,374 | 1/1964 | Ladner | 119/1 X |
| 3,577,956 | 5/1971 | Foster | 119/15 |
| 3,734,057 | 5/1973 | Lee | 119/1 |

*Primary Examiner*—Louis G. Mancene
*Assistant Examiner*—J. N. Eskovitz
*Attorney, Agent, or Firm*—Thomas A. Fournie

[57] ABSTRACT

An animal toilet suitable for installation indoors or outdoors by connection to a conventional plumbing system includes a toilet bowl having a substantially flat bottom in which a dog may stand while relieving itself and is arranged to clean animal excrement from the toilet bowl by simultaneously flushing and wiping the bowl to move the excrement into a discharge outlet. The toilet may be arranged for automatic actuation.

12 Claims, 2 Drawing Figures

PATENTED SEP 17 1974　　　　　　　　　　　　　　　3,835,812

ANIMAL TOILET

BACKGROUND OF THE INVENTION

The present invention relates to toilets and more particularly to a toilet suitable for use by an animal, such as a dog.

Heretofore, animal toilets have been devised. Prior art animal toilets, however, have frequently been of unduly complicated construction and operation, and have tended to frighten dogs and other animals. Consequently, it has been difficult to train dogs to use such animal toilets. Further, these prior art toilets oftentimes have not been capable of disposing of solid animal excrement or have had the disadvantage that the solid excrement tended to stick therein. As a result, unless the toilets were cleaned, they quickly became unsanitary, thereby creating an unpleasant condition for the animal owner as well as the animal using the toilet.

SUMMARY OF THE INVENTION

It is, accordingly, an object of the present invention to provide an improved animal toilet suitable for use by dogs characterized by being relatively simple and inexpensive to construct, of relatively simple construction and operation so as to not frighten pets, and capable of efficiently disposing of both liquid and solid animal excrement.

It is further an object of the present invention to provide an improved animal toilet capable of disposing of solid animal excrement by positively moving the excrement to a discharge outlet and simultaneously cleaning the toilet by a flushing and wiping action.

It is also an object of the present invention to provide an improved animal toilet suitable for installation indoors or outdoors which is arranged for connection with any conventional type plumbing system.

In accomplishing these and other objects, there is provided in accordance with the present invention an animal toilet having a toilet bowl with a substantially flat bottom in which a dog may stand while relieving itself. The toilet operates to clean animal excrement from the toilet bowl by simultaneously flushing the bowl and physically moving solid animal excrement into a discharge outlet. The animal toilet may be arranged to be automatically actuated either periodically or in response to movement into and out of the toilet bowl.

Additional objects of the present invention reside in the specific construction of the exemplary animal toilet hereinafter particularly described in the specification and shown in the several drawings.

DETAILED DESCRIPTION OF THE PREFERRED EMBODIMENT

Figure 1:
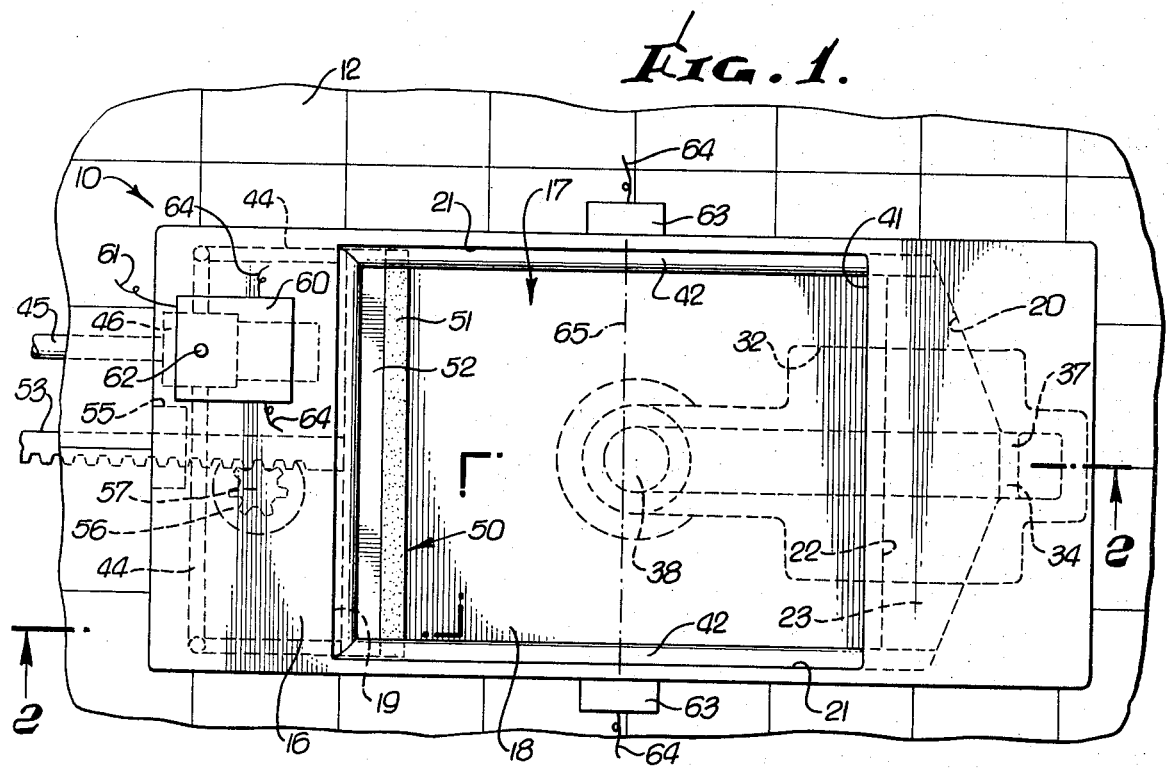
FIG. 1 is a top plan view of an animal toilet according to the present invention.

Referring to the drawings in more detail, there is shown an animal toilet generally designated by the numeral 10. The toilet 10 is illustrated mounted in a floor 11 covered by tile 12.

The toilet 10 has a toilet bowl 15 made of a suitable material, such as porcelain. The bowl 15 has a flat top 16 which is mounted substantially flush with the surface of the floor 11. The bowl 15 defines an upwardly opening preferably rectangular basin 17 which is recessed below its top 16. The basin 17 is defined by a substantially flat bottom 18, end walls 19 and 20, and two side walls 21. The walls 19–21 preferably extend vertically and the bottom 18 slopes downwardly at a slight incline from the end wall 19 towards the end wall 20.

The bottom 18 has an edge portion 22 remote from the end wall 19. The edge portion 22 is spaced apart a predetermined distance from the end wall 20 and preferably extends between the side walls 21 parallel with the central portion of the end wall 20. Thereby, a discharge opening 23 is defined in the bottom of the basin 17 which extends between the side walls 21 adjacent the end wall 20.

Defined by the bowl 15 below and in communication with the discharge opening 23 is a basin 30 which is smaller than the basin 17. The basin 30 is defined by the lower side of the bottom 18, bottom surfaces 31, 32, 33 and lip 34. The bottom surface 33 extends substantially horizontally and is located midway between the side walls 21 vertically below the discharge opening 23. The bottom surface 31 slopes upwardly from the surface 33 towards the end wall 19 and intersects with the bottom 18 along line 35. The surfaces 32 slope upwardly from the surface 33 and intersect the side walls 21 along lines 36. The lines of intersection 35 and 36 are located below the bottom 18, but above the upper edge of the lip 34. The lip 34 extends upwardly from the surface 33 and defines the lower edge of a horizontally disposed outlet opening 37.

The outlet opening 37 communicates with the basin 30. A channel 38 is defined in the bowl 15 below the basin 30 which connects the outlet 37 in communication with a sewer pipe 39. The pipe 39 may connect with a conventional city sewer system, a septic tank, cesspool or other waste disposal system.

Formed as part of the toilet bowl 15 is a cover portion 41 which extends over the discharge opening 23 a predetermined distance thereabove to prevent an animal from stepping therein.

Figure 2:
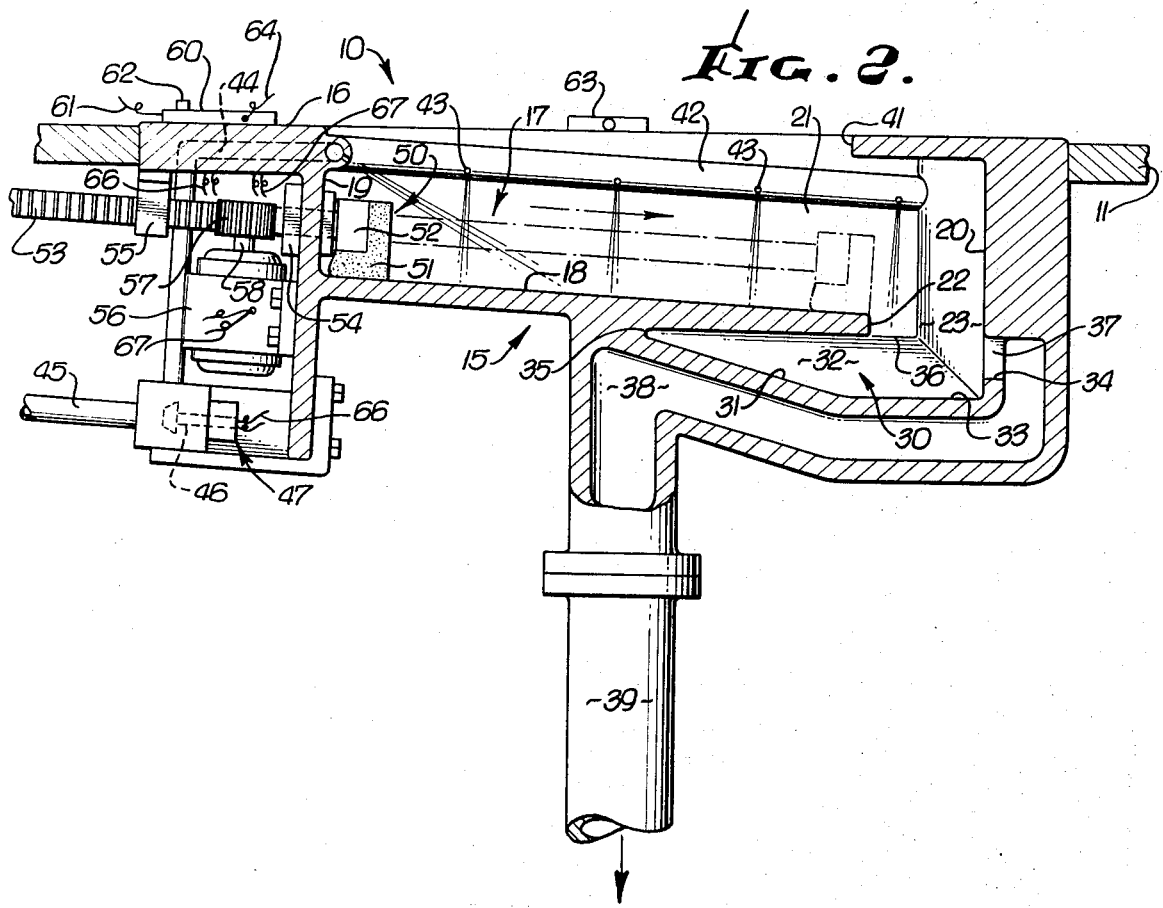
FIG. 2 is a view taken along the line 2—2 of FIG. 1.

Mounted along the side walls 21 and the end wall 19 of the toilet bowl are water tubes or pipes 42 having holes 43 therein which define sprayers. The sprayers 43 are positioned and formed to spray water from the conduits 42 onto the bottom 18 of the basin 17, as shown in FIG. 2. The water tubes 42 are connected in communication with a source of pressurized water through pipes 44 and 45. The pipe 45 is connected to the source of pressurized water and a normally closed valve 46 operated by a solenoid 47 connects the pipe 45 to the pipes 44.

Mounted for movement along the bottom 18 of the basin 17 is a conventional squeegee 50. The squeegee 50 is positioned below the water conduits 42 and is dimensioned to extend from one to the other side wall 21 of the basin 17. The squeegee 50 has a sponge portion 51 positioned in contact with the basin bottom 18 and a rigid transverse or cross member 52 upon which the sponge 51 is mounted. Connected to the cross member 52 is a rack 53. The rack 53 extends perpendicularly to the end wall 19 and therethrough through a seal 54. In addition to operating as a seal, the structure 54 also provides a guide for the rack 53. Formed on the bowl 15, a selected distance from the seal 54, is a second guide 55 for the rack 53. The guides 54 and 55 are aligned along the longitudinal axis of the basin 17 and operate to guide the movement of the squeegee 50 so that it slides along the basin bottom 18.

Connected to drive the rack 53 is an electric motor 56. The motor 56 has a pinion 57 secured on its output shaft 58 which engages the rack 53. The motor 56 is mounted in a suitable location on the bowl structure 15.

The operation of the toilet 10 is controlled by a conventional control box or mechanism 60. The control box 60 is connected to a source of electrical power by electrical leads 61 and may be manually or automatically actuated. The control box 60 is actuated manually by pushing the flush button 62 or automatically by a sensing mechanism, such as the electric eye mechanism 63 shown. The electric eye mechanism 63 is connected by electrical leads 64 to the control box 60.

As shown in the drawings, the electric eye mechanism 63 establishes a light beam 65 across the basin 17. Thereby, when a dog enters the basin 17 to relieve itself the light beam 65 is temporarily broken until the dog leaves the basin 17. The control box 60 is designed to sense the change in electrical output of the electric eye 63 appearing on the leads 64 caused by the braking and reestablishing of the beam 65 and is actuated thereby.

The control mechanism 60 when actuated generates a solenoid actuating signal of a predetermined duration on electrical leads 66 and a motor drive signal of predetermined duration on electrical leads 67. The leads 66 are connected to the solenoid 47 and the leads 67 are connected to the motor 56.

In operation, the toilet 10 is cleaned by the operation of the control mechanism 60 whenever the flush button 62 is actuated or the light beam 65 is broken and reestablished. The control mechanism 60 simultaneoulsy generates the solenoid actuating signal and the motor drive signal. In response to the solenoid actuating signal, the valve 46 opens and jets of water spray from the holes 43 into the basin 17. At the same time the motor 56 is driven by the motor drive signal to advance the squeegee 50 from its retracted positon against end wall 19, shown in solid lines, to the position shown in broken lines in FIG. 2 whereat it is positioned at the edge 22 of the basin bottom 18. Thereby, solid and liquid excrement are simultaneously washed and wiped from the basin bottom 18 into the discharge outlet 23. The excrement is carried by the water flowing through the discharge outlet 23 in a conventional manner through the outlet 37 and the channel 38 into the sewage pipe 39.

Once the squeegee 50 reaches the end of its stroke, i.e., is fully extended to the edge 22, the drive signal to the motor 56 is reversed to retract the squeegee 50 against the end wall 19. The reversal of the polarity of the motor drive signal supplied to the motor 56 may be accomplished in any conventional manner, such as by the use of limit switches actuated by the squeegee or rack or a timing circuit in the control box 60. Once the squeegee 50 is retracted, the solenoid 47 is deenergized to close the valve 46 and stop the flow of water into the pipes 44 and 42.

It is noted that sensing means other than an electric eye may be used for automatically flushing the toilet 10 after an animal has relieved itself and that a timer could be included in the toilet control circuit for periodically actuating the toilet, such as every several hours, to ensure that the basin 17 is maintained clean. Also, more than one squeegee arrangement could be employed for moving the solid animal excrement into the discharge outlet of the basin 18. For example, if the discharge outlet 23 were located in the center of the basin bottom 18, a plurality of squeegees or other suitable arrangements could be disposed around the discharge outlet and operated in controlled manner to push the solid animal excrement therein. Additionally, the squeegee 50 or at least its sponge porton 51 is preferably replaceable.

Although I have herein shown and described my invention in what I have conceived to be the most practical and preferred embodiment, it is recognized that departures may be made therefrom within the scope of my invention.

I claim:
1. An animal toilet, comprising:
a toilet bowl defining an upwardly opening basin, said toilet bowl having a discharge outlet defined in the bottom of said basin and including structure means for connecting said discharge outlet in communication with a sewer pipe:
selectively operable flushing means for washing said basin with water, said flushing means being arranged for connection to a source of pressurized water;
selectively operable means for physically moving solid animal excrement into said discharge outlet; and
control means connected to said flushing means and said solid animal excrement moving means for actuating said flushing means and solid animal excrement moving means in a controlled manner whereby to clean said basin and dispose of animal excrement through said discharge outlet.
2. The invention defined in claim 1, wherein:
said control means simultaneously operates said flushing means and said solid animal excrement moving means; and
said solid animal excrement moving means is operable to wipe said basin as it moves solid animal excrement to said discharge outlet.
3. The invention defined in claim 1 wherein:
said basin has a substantially flat bottom; and including:
cover structure positioned a selected distance above said discharge outlet to prevent an animal from stepping therein.
4. The invention defined in claim 1, including means for manually actuating said control means.
5. The invention defined in claim 1, including means for automatically actuating said control means after an animal has relieved itself in said basin.
6. An animal toilet, comprising:
a toilet bowl defining an upwardly opening rectangular basin with first and second substantially vertical end walls, two substantially vertical side walls, and a substantially flat bottom, said toilet bowl having a discharge outlet defined in its bottom adjacent said first end wall and the bottom of said basin sloping at a slight incline downwardly towards said discharge outlet, said discharge outlet extending between said side walls, said toilet bowl including structure means for connecting said discharge outlet in communication with a sewer pipe;

cover structure positioned a selected distance above said discharge outlet to prevent an animal from stepping therein;

tubes having holes therein positioned along the walls of said basin for spraying water into said basin;

conduit means connected to said tubes for connecting said tubes in communication with a source of pressurized water;

solenoid operated valve means mounted in said conduit means for controlling the flow of water to said tubes;

a squeegee positioned on the bottom of said basin to extend thereacross between said side walls, said squeegee having sponge thereon for wiping the bottom of said basin;

rack and pinion means for moving said squeegee from a retracted position adjacent said second end wall to an extended position along the edge of said discharge outlet;

motor means for selectively driving said rack and pinion means; and control means connected to said motor means and said solenoid operated valve means to simultaneously operate said motor means and valve means to clean said basin by washing it with water, pushing animal excrement into said discharge outlet and wiping the bottom of said basin with said squeegee.

7. The invention defined in claim 6, including means for manually actuating said control means.

8. The invention defined in claim 7, including means for automatically actuating said control means after an animal has relieved itself in said basin.

9. An animal toilet, comprising:
a toilet bowl defining an upwardly opening basin, said toilet bowl having a discharge outlet defined in the bottom of said basin and including structure means for connecting said discharge outlet in communication with a sewer pipe;

selectively operable flushing means for washing said basin with water, said flushing means being arranged for connection to a source of pressurized water;

selectively operable means for physically moving solid animal excrement into said discharge outlet, said solid animal excrement moving means including at least one squeegee and being operable to wipe said basin as it moves solid animal excrement to said discharge toilet; and control means connected to said flushing means and said solid animal excrement moving means for actuating said flushing means and solid animal excrement moving means in a controlled manner whereby to clean said basin and dispose of animal excrement through said discharge outlet, said control means simultaneously operating said flushing means and said solid animal excrement moving means.

10. The invention defined in claim 9, wherein:
said basin has a substantially flat bottom;
said discharge outlet is defined in one end of said basin; and including:
cover structure positioned a selected distance above said discharge outlet to prevent an animal from stepping therein.

11. An animal toilet, comprising:
a toilet bown defining an upwardly opening basin, said toilet bowl having a discharge outlet defined in the bottom of said basin and including structure means for connecting said discharge outlet in communication with a sewer pipe;

selectively operable flushing means for washing said basin with water, said flushing means being arranged for connection to a source of pressurized water;

selectively operable means including at least one squeegee for physically moving solid animal excrement into said discharge outlet and wiping said basin while moving the solid animal excrement; and control means connected to said flushing means and said solid animal excrement moving means for actuating said flushing means and solid animal excrement moving means in a controlled manner whereby to clean said basin and dispose of animal excrement through said discharge outlet.

12. The invention defined in claim 11, wherein:
said basin has a substantially flat bottom;
said discharge outlet is defined in one end of said basin; and including:
cover structure positioned a selected distance above said discharge outlet to prevent an animal from stepping therein.

* * * * *